United States Patent [19]
Schenk

[11] 3,781,961
[45] Jan. 1, 1974

[54] INSERT POSITIONING AND FASTENING APPARATUS

[75] Inventor: Peter Schenk, West Islip, N.Y.

[73] Assignee: Dzus Fastener Co., Inc., West Islip, N.Y.

[22] Filed: Feb. 4, 1972

[21] Appl. No.: 223,455

[52] U.S. Cl. .............................. 29/200 P, 29/208 E
[51] Int. Cl. ...................... B23p 19/00, B23p 19/04
[58] Field of Search ...................... 29/200 P, 208 D, 29/200 B, 200 R, 208 R, 208 E

[56] References Cited
UNITED STATES PATENTS
3,647,252    3/1972    Nolin et al. .................... 29/200 P X Primary Examiner—Thomas H. Eager
Attorney—David S. Kane et al.

[57] ABSTRACT

An apparatus for automatically positioning and fastening an insert in a panel. The apparatus includes a supporting structure and a releasable holding member on the supporting structure for holding the insert prior to and during the positioning thereof in the panel. A drive mechanism is on the supporting structure to automatically position the insert in the panel at the desired location. A reservoir of potting material is associated with the supporting structure for supplying a potting compound to the apparatus. The structure includes potting mechanisms for automatically supplying a predetermined amount of potting material to the positioned insert in the panel to fasten the insert therein. The apparatus provides for ejection automatically to release the insert from the structure after it has been properly positioned in the panel. Finally, the apparatus controls and orients the insert with respect to the panel and activates the drive, potting and eject mechanisms at the appropriate time.

9 Claims, 29 Drawing Figures

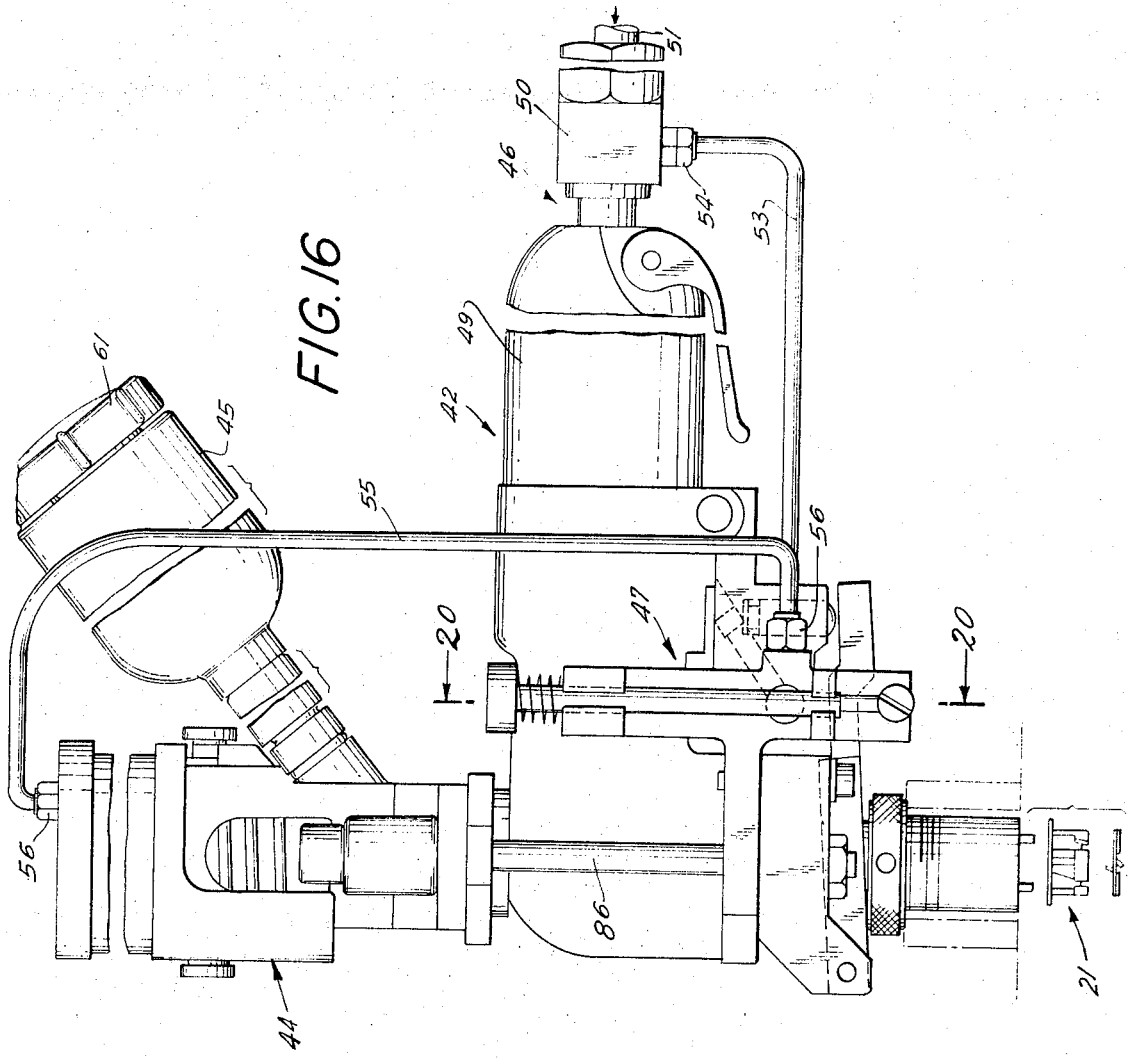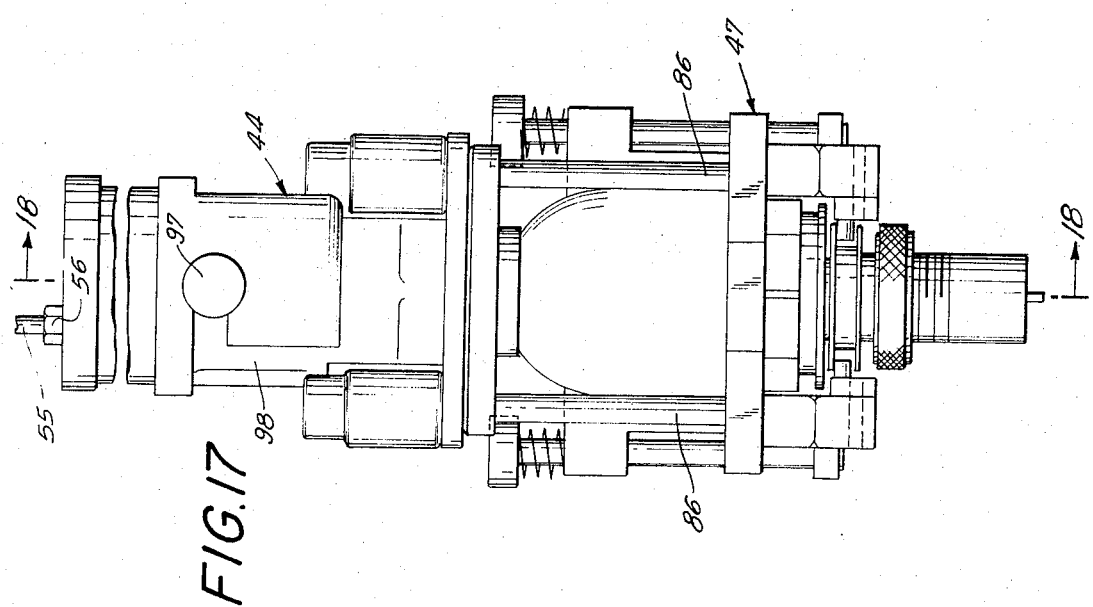

3,781,961

INSERT POSITIONING AND FASTENING APPARATUS

BACKGROUND OF THE INVENTION

In construction, particularly in the aircraft industry, it is often necessary to employ lightweight panelling for interior surfaces. This panelling is often somewhat hollow in structure, such as honeycomb in nature, to decrease the weight. Consequently, when it is desired to fasten something to a wall panel, it is often adviseable to anchor a receptacle means or insert in the wall panel to receive the fastener member during the fastening operation.

Positioning and anchoring the inserts within the panel is often a time consuming and difficult operation. When considering a very large structure such as an airplane when many, many fasteners are employed, it can be readily seen that positioning of a large number of inserts within the panel walls can be a very time consuming and expensive labor operation during construction. For example, one method of positioning and anchoring the inserts within the panels is to first cut out a round hole in the rather fragile panel with a separate cutting member. The cutting member is then removed and the material which has been cut is plucked out with a pair of tweezers. Thereafter, a two-piece assembly is placed in the hole with adhesive and is held in position with the potting material until it bonds in position and is anchored. The entire operation is done by hand and each separate step must be done for each individual insert. Frequently this requires the time of ten minutes per insert which is clearly undesirable from a time standpoint.

It should also be kept in mind that the various configurations of inserts being employed in the art today do not facilitate the adhering of the insert within the hole in the panel. The prior art configurations and structures render the potting operation somewhat difficult thereby increasing the inefficient and costly time consuming operations necessitated by the known insert structures.

SUMMARY OF THE INVENTION

With the above thoughts in mind, it is among the primary objectives of this invention to provide a method and apparatus for automatically positioning and fastening an insert in a panel rapidly and efficiently. The apparatus includes a supporing structure with a releaseable holding mechanism on the supporting structure for holding the insert prior to and during positioning thereof in the panel. Drive means are provided on the supporting structure to automatically position the insert in the panel at the desired location. A reservoir of potting material is associated with the supporting structure for supplying a potting compound to the apparatus. Potting means are on the supporting structure for automatically supplying a predetermined amount of potting material to the positioned insert in the panel to fasten the insert therein. Eject means are on the supporting structure for automatically releasing the insert from the supporting structure after it has been properly positioned in the panel. Finally, control means are on the supporting structure to orient the insert held by the holding means with respect to the panel and to activate the drive means at the desired time and thereafter activate the potting means followed by the ejecting means after the insert has been positioned and fastened in the panel.

BRIEF DESCRIPTION OF THE DRAWINGS

In the drawings:

FIG. 16 is a side elevation view of the insert positioning and fastening apparatus with an insert positioned adjacent thereto;

FIG. 17 is an end elevation view thereof;

BRIEF DESCRIPTION OF THE PREFERRED EMBODIMENTS

Figure 1:
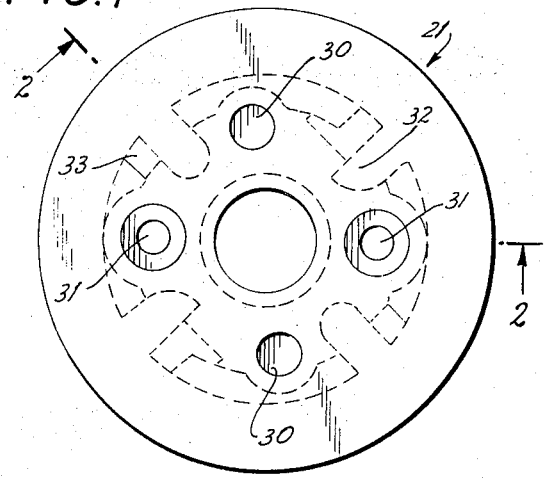
FIG. 1 is a top plan view of an insert of the invention with a washer connected thereto.

Insert 21 is depicted in detail in FIGS. 1–6. Insert 21 includes a body portion 22 which may be constructed of a nylon material or any other convenient rigid plastic material. On the upper surface of insert body portion 22 is a washer 23 which is of a greater diameter than cylindrically shaped body portion 22. In this manner an annular flange 24 is provided for engagement between the washer and panel 25 upon insertion of insert 21 within panel 25. As shown, the washer 23 is molded as one piece with the body 22. Alternatively the washer may be independent of the insert until the potting step at which time the potting compound will bond the washer to the insert and panel as well as bonding the insert to the panel. In the embodiment shown a common type of hot melt adhesive 23' is on the underside of washer 23. The heat generated in positioning the insert is sufficient to melt the adhesive to permit it to bond the washer to the outer surface of the panel 25. Mounted on the lower surface of insert 21 is a drilling plate 26. Plate 26 has a pair of outstanding projections 27 which extend into appropriate recesses in the undersurface 28 of body 22 to hold drilling plate 26 in proper position with respect to insert body 22. On the undersurface of drilling plate 26 at 90° intervals are four cutting blades 29 which serve to displace the material within the panel as the insert is rotated thereby cutting a hole for the insert. The outer diameter of drilling plate 26 is substantially the same as the outer diameter of the undersurface 28 of insert body 22.

On the upper surface of insert body 22 are a pair of opposed openings 30 which are adapted to be engaged by corresponding projections of a washer to facilitate proper alignment and interengagement of the washer and insert during handling. A pair of larger openings 31 are also positioned on the upper surface of insert body 22 and extend through the entire body section of insert body 22. Openings 31 are engaged by pins during the positioning and sealing of the insert in panel 25. Potting material is injected into openings 31 through pins in the apparatus used for the purpose of fastening insert 21 within panel 25 after it has been properly positioned therein. A series of spaced cut-outs 32 are located around the circumference of insert 21 to assist in providing passageways for the potting material to fill the open spaces in the drilling hole in the panel with insert 21 positioned therein. Interspaced between the cut-outs are a series of shoulders 33. The shoulders assist in positively seating the insert within the panel since the potting material will engage with the upper surface of shoulders 33 and serve in locking insert 21 in position within panel 25. The insert has a central threaded bore 34 to receive a fastener element when the insert is used to lock two panel members together. Although a threaded interengagement is depicted, other common type of fastener engagement can be utilized equally as well. It should be kept in mind that holes 31 and cut-outs 31 are interconnected to facilitate movement of the potting material into all of the open spaces within the drilled hole in panel 25 in which insert 21 is positioned.

Figure 7:
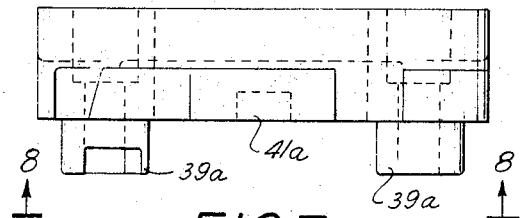
FIG. 7 is a side elevation view of the body portion of an alternate embodiment of an insert of the invention.
Figure 9:
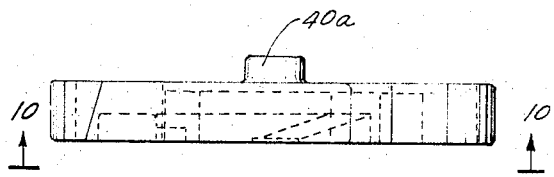
FIG. 9 is a side elevation view of the nut retainer portion of the alternate embodiment of the insert of the invention.
Figure 8:
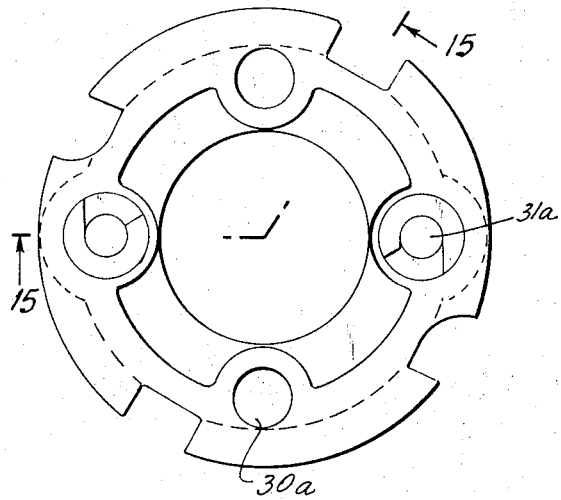
FIG. 8 is a bottom view thereof taken along the plane of line 8—8 of FIG. 7.
Figure 10:
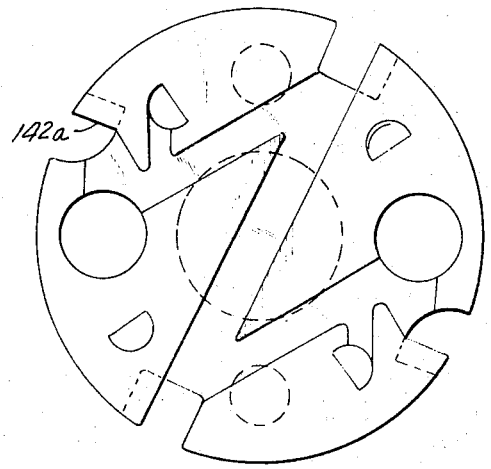
FIG. 10 is a bottom view thereof taken along the plane of line 10—10 of FIG. 9.
Figure 11:
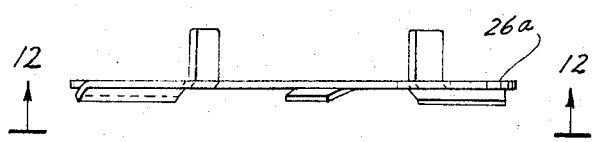
FIG. 11 is a side elevation view of a cutter blade for attachment to the alternate embodiment insert.
Figure 12:
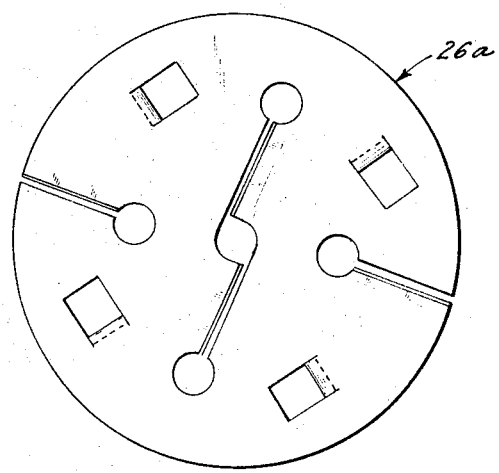
FIG. 12 is a bottom view thereof taken along the plane of line 12—12 of FIG. 11.
Figure 13:
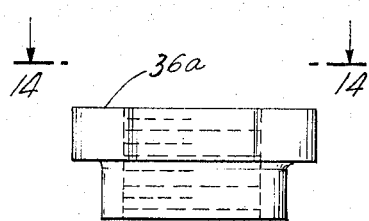
FIG. 13 is a side elevation view of the nut portion of an alternate embodiment of an insert of the invention.
Figure 14:
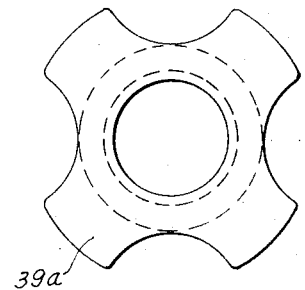
FIG. 14 is a top view thereof taken along the plane of line 14—14 of FIG. 13.
Figure 15:
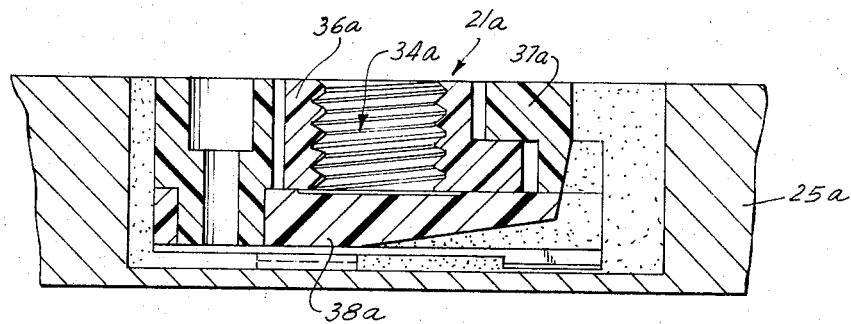
FIG. 15 is a sectional elevation view of the alternate embodiment of the insert of the invention shown positioned and fastened in a panel.

An alternate embodiment for the insert is depicted as insert 21a in FIGS. 7–15. In some instances it is desirable to have movement of the threaded central opening in the insert to permit its engagement with the fastener element. Therefore, the object of the alternate embodiment depicting insert 21a is to have a central member including the threaded central opening 34a which is movable within the remainder of the insert in floating manner so that it can be easily engaged with the fastener element. In regard to insert 21a itself, the drilling member 26a is substantially the same as member 26 in the previously discussed embodiment. Additionally, it is held in position with respect to the undersurface of the insert in the same manner as in the previously discussed embodiment. Additionally, the interconnected passageways for the potting compound are substantially the same as well as the openings for engagement with the positioning apparatus. As previously stated, the difference lies in the provision of a floating or movable insert nut 36a which is caged in position within the insert and which facilitates engagement with the fastener member. Nut 36a is caged by means of retention by a body portion 37a in cooperation with a retainer portion 38a. Floating nut 36a includes a number of spaced prongs 39a the upper surface of which are engaged by a shoulder on body 37a. The undersurface of prongs 39a are engaged by retainer member 38a. The retainer member and body member are interengaged in a conventional manner to cage nut 36a between the body and retainer portions. The resultant opening formed by the engagement of body portion 37a and retainer 38a is somewhat larger than the outer dimensions of nut 36a. This permits movement of nut 36a to a predetermined degree while still retaining the nut in caged position. Therefore, when a fastener is brought into contact with insert 21a the movement of the fastener with respect to the movable nut will facilitate engagement between the fastener and threaded receiving opening 34a. As previously stated, the positioning of insert 21a within a panel 25a is the same as in respect to the originally discussed embodiment of the insert 21. The manner in which the retainer member 38a is interengaged with the body member 37a is best depicted in FIGS. 7 and 9. A pair of projections 39a extend outwardly from body 37a and enter into appropriate recesses in retainer 38a. Additionally, an upward projection 40a on retainer 38a is positioned so as to enter an appropriate recess 41a of body 37a. Interengagement of these portions of the insert 21a along with whatever desired additional fastening means are employed is sufficient to cage nut 36a within the resultant chamber formed by retainers 38a and 37a in interengagement.

Figure 2:
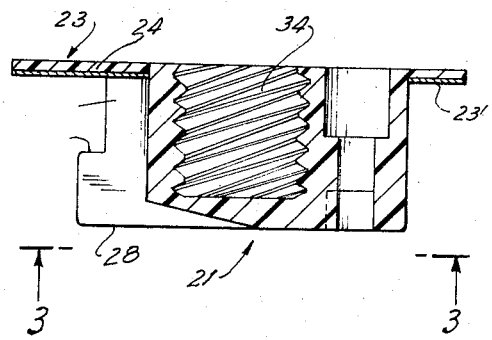
FIG. 2 is a sectional elevational view thereof taken along the plane of line 2—2 of FIG. 1.
Figure 3:
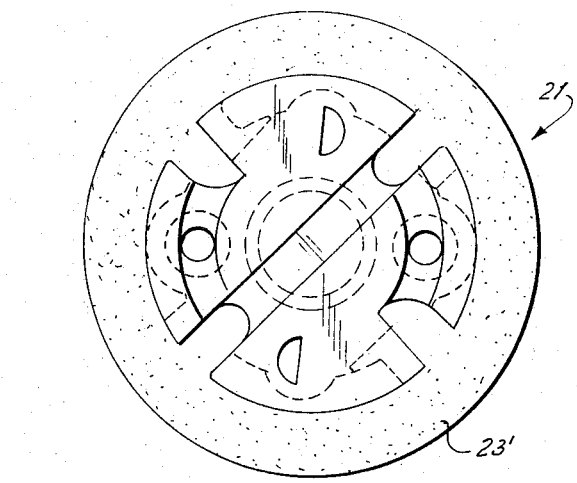
FIG. 3 is a bottom plan view thereof taken along the plane of line 3—3 of FIG. 2.
Figure 4:
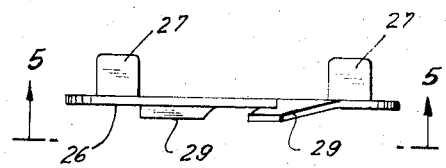
FIG. 4 is a side elevation view of a cutter blade to be attached to an insert of the invention.
Figure 6:
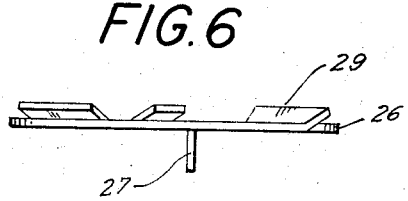
FIG. 6 is an end elevation view thereof taken along the plane of line 6—6 of FIG. 5.
Figure 5:
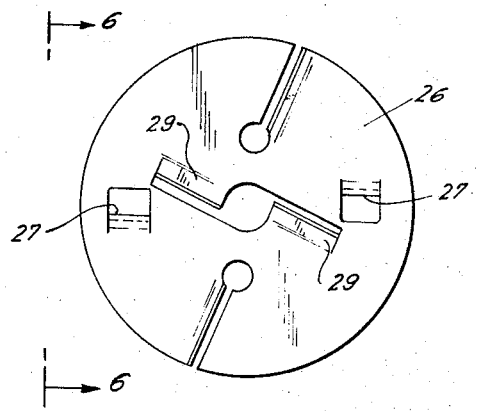
FIG. 5 is a top plan view thereof taken along the plane of line 5—5 of FIG. 4.

FIGS. 1–3 of the drawings show the apparatus 42 in assembled condition and its position relative to insert assembly 21 for cooperation therewith. Apparatus 42 includes a main housing structure 43. Mounted to the main housing structure is a piston assembly 44. Interconnected with the pressure cylinder assembly is a potting compound container assembly 45 in position so that the potting compound as it leaves the container will be positioned in respect to the pressure cylinder for transportation into the remainder of the apparatus and thereafter be expelled therefrom to mount insert assembly 21 into a panel.

Horizontally connected to the main housing structure 43 is the compressed air assembly 46. The compressed air assembly is utilized to pressurize the entire apparatus 42 for operation thereof. The control means assembly 47 is approximately centrally mounted with respect to the supporting housing 43. The drive mechanism 48 is housed within the supporting housing 43 so as to communicate with the remainder of apparatus 42.

The air supply means includes a compressed air cylinder 49 which is attached to a manifold 50. The manifold has an air inlet 51 and air exit 52. Air supply tube 53 is connected to air exit 52 in sealed relationship by means of fastener 54. The other end of air supply tube 53 is interconnected with control means 47 and supporting structure 43. By means of the internal passageways to be discussed in greater detail below, the air or a portion thereof is then directed to a second tube 55 which is connected by means of fastener 56 to control means assembly 47 at one end thereof. The other end of inner tube 55 is connected by means of airtight fastener 56 to piston assembly 44. In this manner, the desired air pressure can be directed to both the control means 47 of apparatus 42 and the piston assembly 44 of apparatus 42 where air is needed to accomplish the various driving functions of apparatus 42.

Figure 18:
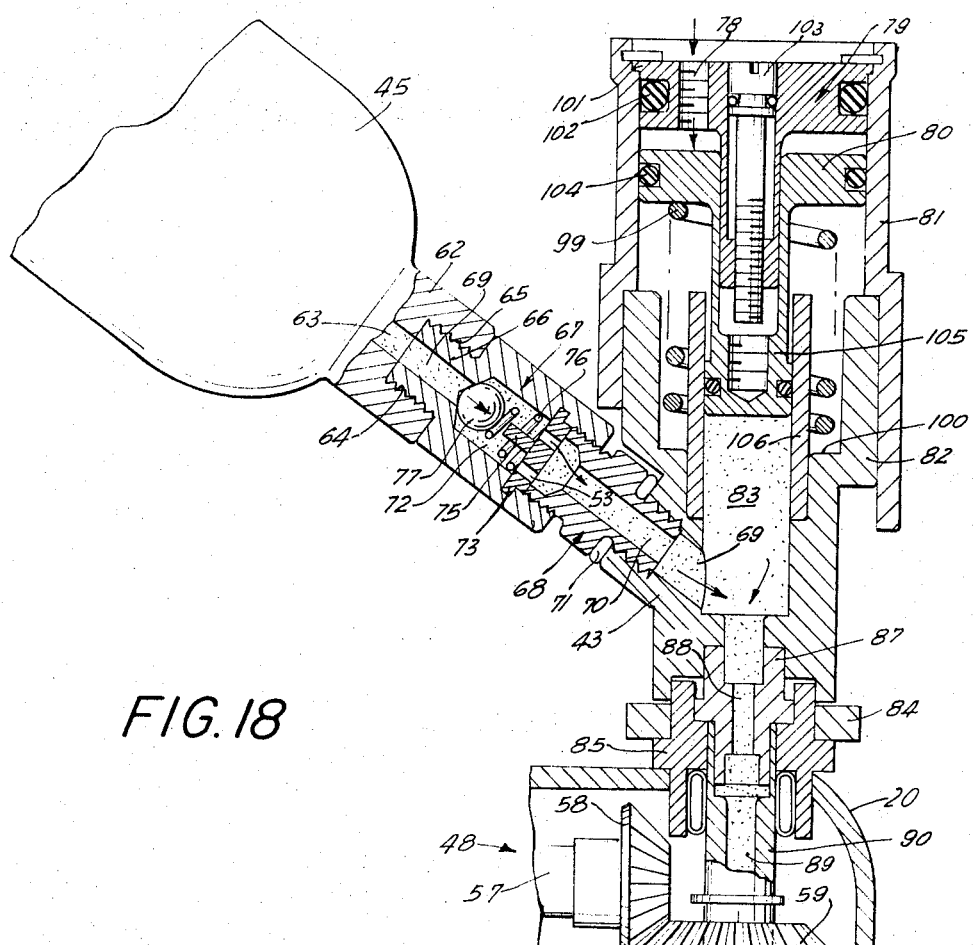
FIG. 18 is a partial sectional view thereof taken along the plane of line 18—18 of FIG. 17.

Air cylinder 49 also is connected in a conventional manner to a drive shaft 57 as shown in FIG. 18 mounted within supporting housing or structure 43. At the forward end of drive shaft 57 is a beveled gear 58 which interengages with a vertical beveled gear 59 in order to drive the rotary shaft 60 within housing 43 to facilitate the drilling operation within a panel.

The potting container 45 holds the supply of adhesive or potting compound to be used within apparatus 42 to adhesively mount the insert in the opening in a panel. It should be kept in mind that potting container 45 is mounted to the remainder of apparatus 42 to facilitate the portable nature of the overall apparatus structure. The container is of a bottle-like configuration as shown and has a rear cap 61 connected to conventional internal structure within container 45 to provide a pump means for pumping the potting material or adhesive from container 45 into the remainder of the apparatus.

The forward end of container 45 is of a reduced diameter and forms neck 62 which has a passageway 63 therethrough to permit communication between the interior and exterior of container 45. The interior forward end of neck 62 has a threaded inner surface 64 for interengagement with the threaded outer surface 65 of a rear extension 66 of valve housing 67. The forward end portion of valve housing 67 is in threaded interengagement with the rear end portion of fitting 68. The forward end portion of fitting 68 is in threaded interengagement with the inner surface of opening 69 in supporting structure 43. A continuous passageway is provided between container 43 and the interior of supporting structure 43 by means of the interconnection between passageway 63, passageway 69 in valve housing 67 and passageway 70 in fitting 68.

A positive seal is maintained between fitting 68 and supporting structure 43 by gasket 71 positioned therebetween. The main body portion of valve housing 67 contains a valve chamber 72 which forms a portion of the through passageway 69. Forming the base portion of valve chamber 72 is a spring retainer 73. Retainer 73 is mounted to the inner side walls of valve housing 67 and contains an annular opening 74 which continues the through passageway between container 45 and the interior of structure 43. Extending upwardly from the disc shaped spring retainer is a centrally located stem 75 about which is mounted a helical spring 76. One end of helical spring 76 rests against base 73 and the other end rests against a ball valve 77. The spring 76 is normally in a compressed condition so as to seat ball valve 77 against the inwardly directed inner surfaces of valve chamber 72 and prevent through flow between container 45 and opening 69 in structure 43. A predetermined force is required to unseat ball valve 77 and permit the potting fluid to pass from the container into the supporting structure. It should be noted that container 45 is positioned between the vertical and horizontal plane with respect to the apparatus so that when the potting material is moved from the container into supporting structure 43 it will be assisted by gravitational forces. This is helpful since the adhesive or potting material is generally of a very viscous nature and therefore normally resistant to flow. Additionally, the potting compound is under pressure in the container 45. Threaded interengagement between cap 61 and container 45 provides the pressure applied to the potting compound in the container 45 in a conventional manner.

Turning to consideration of the piston assembly or cylinder 44, as previously stated, tube 55 containing the air under pressure is connected to the top of cylinder 44. The air is then forced into the cylinder through a passageway 78 in the piston head 79 so that it bears against piston 80. Piston 80 is slideably housed in a two-piece housing assembly. The upper removably half 81 of the housing assembly is sealingly engaged with the lower fixed half 82. The fixed half 82 of the piston housing forms a portion of supporting housing 21 and includes opening 69 for introduction of the potting medium into the central axial chamber and bore 83 through cylinder 44 and the remainder of supporting structure 43. The lower end of the fixed portion 82 of piston cylinder 43 rests on support bracket 84. Mounted within support bracket 84 is stationary sleeve 85. This sleeve 85 is fixed in position within main support structure 43. Two opposing support brackets 86 are mounted at their upper end to bracket 84 and at their lower end to another stationary portion of the main supporting structure 43. An inner sleeve 87 is mounted on a shoulder within outer sleeve 85 as depicted in FIG. 18 and has a passageway 88 therethrough to permit communication between the chamber 83 in lower portion 82 and the central bore 89 of rotatable hollow shaft 90 which is journaled at its upper end between outer sleeve 85 and inner sleeve 87. Rotatable shaft 90 is interengaged with beveled gear 59 so that when beveled gear 59 is rotated, shaft 90 will be rotated.

Figure 19:
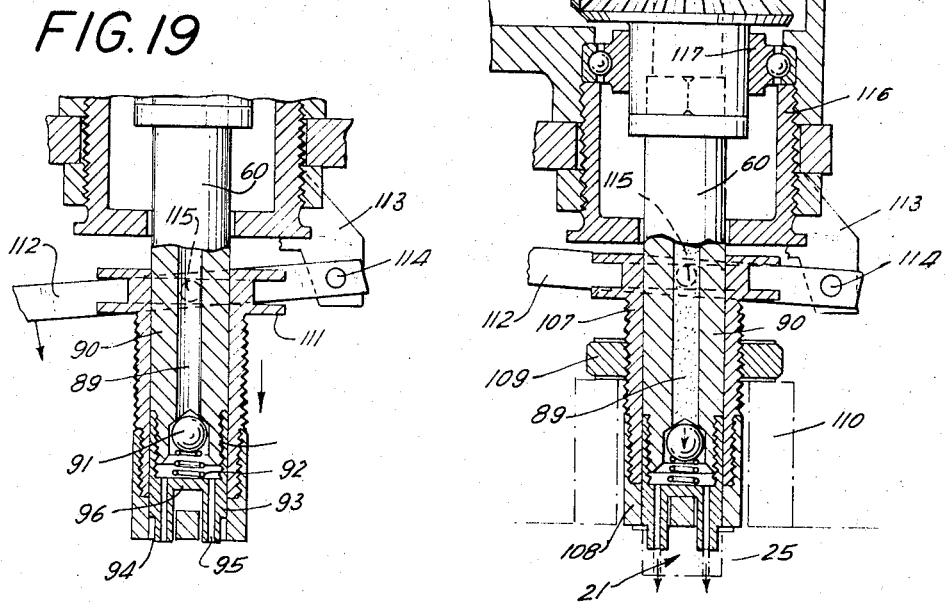
FIG. 19 is a fragmentary sectional view thereof showing the operation of the eject means.

At the lower end of shaft 90 is a valve assembly including a ball valve 91 normally seated to close the opening at the lower end of rotatable shaft 90 and held in position by the bias of helical spring 92. The lower end of helical spring 92 is held in compressed position by being seated on a shoulder formed on the inner surface of detachable working tip 93. Working tip 93 is in threaded interengagement with the lower end of shaft 90 as shown in FIG. 19. The main body portion of working tip 93 includes two downwardly extending prongs or pins 94, each containing a passageway 95 therethrough. Each prong or pin extends downwardly from a main disc-shaped base portion 96 which forms the seat for spring 92 to normally hold ball valve 91 in position sealing off passageway 89 through shaft 90.

When sufficient force is applied by the piston assembly 80 of pressure cylinder 44, the compressed potting material will transmit that force to ball valve 91 against the bias of spring 92 and permit potting material to flow through the chamber housing valve 91 and through interconnected passageways 95 from which it will be projected into passageways in an insert positioned in an opening in a panel.

Returning to consideration of the pressure cylinder and particularly piston assembly 80, it should be noted that upper removable housing 81 is retained in position by means of cam 97 which travels in cam slot 98 in outer housing 81. When the piston cylinder is assembled, the piston assembly is engaged with the upper end of helical spring 99 which has its lower end seated on internal shoulder 100 of fixed lower portion 82. Therefore, when the upper outer housing is positioned about piston assembly 80, cam 97 will move upward in cam slot 98 until it reaches the horizontal portion thereof. Thereafter a rotational movement of movable upper portion 81 will seat cam 97 in the horizontal portion of cam slot 98 thereby maintaining upper portion 81 in assembled relationship to lower portion 82.

The piston assembly has a two-part piston head portion. The upper part 79 is stationary and has its upper rim seated in annular rim 101. A sealing gasket 102 maintains a positive sealing engagement between the inner wall of housing 81 and part 79. An adjusting bolt 103 passes through a central opening in part 79 and is used to set the initial position and stop position of the remaining movable part 80 of the piston. The threaded end of bolt 103 is engaged with a threaded surface on movable piston part 80. An opening 78 through stationary piston part 79 permits communication between air source 55 and the upper surface of movable piston part 80. In this manner the compressed air comes in contact with the movable piston part and drives it downward against the bias of spring 99 as desired. A sealing gasket 104 maintains the positive seal between movable piston part 80 and piston housing 81. The forward portion 105 of movable piston 80 is of reduced diameter so that it may be surrounded by spring 99 and in order that it may be journaled vertically within piston sleeve 106. The forward surface of reduced portion 105 engages with the potting material and drives it downward in the assembly as desired. When the pressure is relieved by reduction of the compressed air force, the biased spring 99 will return movable piston 83 to its initial position as determined by stationary piston head 79 and stop 103.

Slidably mounted on shaft 90 is ejection sleeve 107 in concentric relationship. Outer eject pins 108 are threadedly engaged with the threaded outer surface of eject sleeve 107 and are also concentric with shaft 90. A threaded adjusting screw 109 which forms a stop for the apparatus is in threaded interengagement with the outer surface of eject sleeve 107. By rotating stop 109, the threaded interengagement between it and sleeve 107 will permit it to be vertically adjusted. The bottom surface of stop 109 is positioned so that it will rest on an appropriate jig 110 when the apparatus is in the position where the insert has been properly positioned within a panel 25. At that time the lower surface of stop 109 will engage with the upper surface of jig 110 thereby informing the operator that the positioning step is complete. Shaft 90 is journaled within eject sleeve 107 to permit rotation of shaft 90 with respect to journal 107. Stop 109 and eject mechanism 108 being interconnected with stationary sleeve 107 are also stationary. The upper end of eject sleeve 107 is formed into a flanged wheel configuration 111. Flanged wheel 111 is engaged by a yoke arrangement formed by a pair of parallel and opposing eject levers 112. The inner end of each eject lever is rotatably pinned to extension 113 from supporting structure 43. Pin 114 accomplishes this interengagement. The other end of each lever 112 is free and may be pivoted in an upward or downward direction depending upon the operation during eject. Intermediate the ends of each lever 112 is a fastener 115 to fasten the lever to flanged disc 111. Therefore, when the eject levers 112 are shifted downward and pivoted about pin 114, a force will be applied to flanged disc 111 and interconnected eject members 107 and 108 in a downward direction. Since the bottom edge of eject member 108 is abutting panel 25, the remainder of the apparatus including shaft 90 and pins 94 will be withdrawn upward and away from engagement with insert 21. The eject operation will be discussed in greater detail below.

To permit access to the gear arrangement within housing 43 and to the portion 60 of the shaft assembly, removable bracket plug is in threaded interengagement with an opening in the under side of housing 43. Bearing bracket engages with housing 43 and the upper edge of plug 116 with shaft assembly 60 passing through bearing member 117 and an opening in plug 116 and thereby extending beyond the housing 43. As previously discussed, the entire shaft assembly 60 contains a passageway therethrough to receive the potting compound provided by the container or source 45. The potting compound may be of any commonly known adhesive potting material adaptable for bonding an insert of chosen material into the panel.

The control system for the apparatus is best depicted in FIGS. 20–26 of the drawings. It should be kept in mind that the apparatus may be driven by any conventional drive means attached to drive shaft 57. The control means 47 is shown in the normal non-operating position in FIG. 20. This is the position of the control means when the apparatus 42 is not in use and also when the apparatus is in the drilling stage of use. Control means 47 is primarily for use in providing the potting compound to the insert during the fastening operation and for the eject operation when the apparatus is removed from the positioned and fastened insert within the panel.

Figure 20:
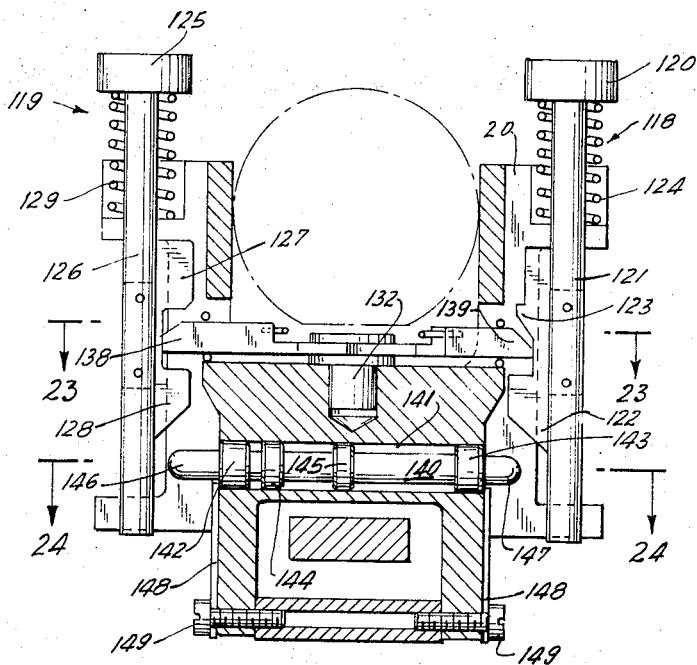
FIG. 20 is an enlarged fragmentary sectional view of the control means of the apparatus shown in normal non-operating position.

As shown in the normal position in FIG. 20, the control apparatus includes a potting switch assembly 118 mounted to the supporting structure 43. Opposed to potting switch assembly 118 with respect to control means 47 is eject switch assembly 119. Potting switch assembly 118 includes a finger piece 120 connected vertically to a shaft 121. Extending horizontally from shaft 121 are cams 122 and 123. Potting switch assembly 118 is designed to move vertically with respect to the apparatus in operation. A spring 124 surrounds the surface of the upper portion of shaft 121 and has one end bearing against a shoulder arm support structure 43 and the other end against the undersurface of cap 120. Therefore, when cap 120 is depressed forcing potting switch assembly downward, spring 124 is compressed so that when pressure on cap 120 is relieved, spring 124 will tend to return switch assembly 118 to its initial position.

Eject switch means 119 has similar components and operates in a similar manner. Cap 125 is attached to vertical shaft 126 which has a pair of cams 127 and 128 extending horizontally therefrom. This assembly 119 is designed to be vertically movable with respect to support 43 on which it is mounted. A spring 129 surrounds the upper portion of shaft 126 and is held in position between a shoulder on support 43 and the undersurface of cap 125 so that it operates similarly to spring 124 when assembly 119 is depressed and thereafter released.

Figure 23:
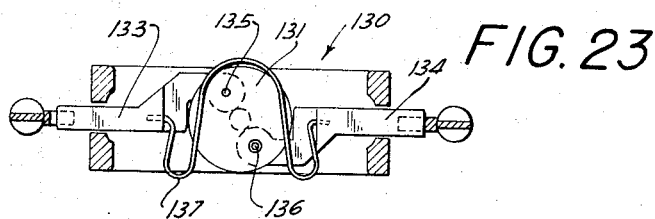
FIG. 23 is a top sectional view thereof taken along the plane of line 23—23 of FIG. 20.

A cam follower control assembly 130 is located in horizontal position between the two opposing control pistons 126 and 121. Cam assembly 130 is mounted to supporting structure 43 by means of rotatable hub 131 and interconnected pin 132. Pin 132 is connected to supporting structure 43. Extending laterally from hub 131 are opposing cam follower control arms 133 and 134. Arm 133 is pinned at point 135 to disc 133 and arm 134 is pinned at point 136 to rotatable hub or disc 131. It should be noted that points 135 and 136 are diametrically opposed on hub 131. Arms 133 and 134 are eccentrically mounted as shown in FIG. 23 so that a horizontal movement of either arm will cause rotation of disc 131 since each arm is not axially aligned with the center of rotation of disc 131. A leaf spring 137 is mounted at one end to arm 133 and at the other end to arm 134 and is positioned in the assembly so that the spring will tend to return the arms to their normal configuration as shown in FIG. 23 after a horizontal force has been removed from the arm. The end portion of arm 133 forms cam surface 138 for response to contact with cam 127. Similarly, the end portion of arm 134 forms cam surface 139 for response to contact with cam 123.

Parallel to control cam follower assembly 130 and mounted in support structure 43 below and spaced from assembly 130 is slidable pin 140. Pin 140 is slidable in horizontal opening 141. Pin 140 is of lesser diameter than cylindrical opening 141 and has a plurality of annular rings of greater diameter mounted thereon. The rings are designed to sealingly engage with the inner walls of opening 141 while being slidable with respect thereto. There are two end rings 142 and 143 adjacent the end portions of pin 140 and intermediate end rings 142 and 143 are a pair of additional rings 144 and 145.

Figure 24:
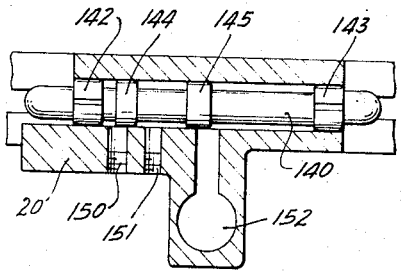
FIG. 24 is a fragmentary sectional view thereof taken along the plane of line 24—24 of FIG. 20.
Figure 25:
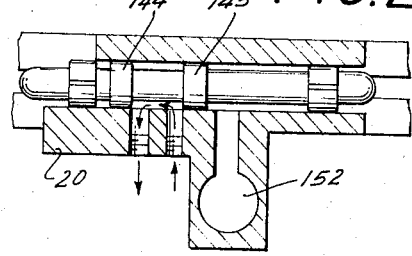
FIG. 25 is a fragmentary sectional view of the apparatus as shown in FIG. 24 with the parts in potting injection position.
Figure 26:
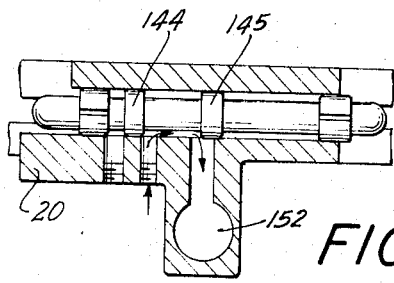
FIG. 26 is a fragmentary sectional elevation view of the parts shown in FIG. 24 in the insert eject position.

Pin 140 is designed to slidably respond to the control buttons and open and close flow paths for the potting compound and compressed air for eject purposes. Tip 146 of pin 140 is responsive to contact with cam 128 to move in one direction and the other tip 147 of pin 140 is responsive to cam 122 to move horizontally in the opposite direction. Leaf springs 148 resiliently control the length of travel of pin 140. The fixed end of each spring 148 is fixed to the structure by a threaded screw 149. FIGS. 24-26 show the three operating positions of pin 140. In FIG. 24 we see the position of the pin during normal operation of the apparatus and when the apparatus is not in use. Supporting structure 43 contains a passageway 150 for communication with the interconnected network described above through which the potting compound flows in apparatus 42. A passageway 151 adjacent to passageway 150 in supporting structure 43 is connected to the source of compressed air from tube 53 as previously discussed. A third passageway in supporting structure 43 adjacent to passageways 150 and 151 is larger passageway 152 which opens into contact with the eject mechanism of apparatus 42 which was described in detail above. All three passageways 150, 151 and 152 are open into horizontal passageway 141 in which pin 140 is mounted. In normal position, end rings 142 and 143 prevent communication between the openings in passageways 150, 151 and 152 and the exterior of cylindrical channel 141. Intermediate ring 144 prevents communication between passageway 150 and both of the other two passageways 151 and 152. Similarly, intermediate ring 145 prevents communication between passageway 152 and either of the other two passageways 150 and 151. In this manner, there can be no fluid flow between any of passageways 150, 151 and 152 when pin 140 is in the normal position as shown in FIG. 24.

When pressure is desired for potting purposes, pin 140 is horizontally deflected by depressing potting switch 118 thereby removing disc 144 from its blocking position between passageway 150 and 151 thereby permitting air to flow from passageway 151 into passageway 150. It should be noted that intermediate ring 145 still maintains a seal between passageways 151 and 152 so that no air may pass into passageway 152. When the eject switch is depressed, pin 140 will be horizontally displaced in the opposite direction as shown in FIG. 26. In that position, intermediate disc 144 permits communication between passageways 150 and 151, however, the other intermediate ring 145 has been displaced sufficiently to permit communication between passageway 151 and passageway 152. In this manner, air may flow therebetween to operate the eject mechanism of apparatus 42. The arrows in FIGS. 25 and 26 show the direction of air flow during the potting and eject operations respectively.

In operation, apparatus 42 is readied for use by providing an air cylinder 49 for air pressure in operating the system and by loading potting container 45 with sufficient potting compound. An insert 21 contains a washer on the upper surface thereof and a drilling plate on the lower surface thereof is manually interengaged with receiving pins 94. The apparatus is then ready for positioning and fastening insert 21 in a panel 25. The washer 23 is fastened to the top surface of insert body 22 by means of extensions on the washer which extend downwardly into openings 30 or is integrally molded therewith. Prongs 94 of apparatus 42 extend into large opening 31 to hold the insert in position. The insert which is attached to apparatus 42 is then positioned at the proper location with respect to panel 25. Insert 21 and apparatus 42 are then extended into the central opening of jig 110 into engagement with the upper surface of panel 25. The drive means is then initiated so that beveled gear 58 drives beveled gear 59 and rotates the drive shaft 90. This rotation causes the cutting blades 29 of driving plate 26 to drill downwardly into panel 25. This drilling action continues until stop 109 comes to rest against the top of fixture 110 at a predetermined location. At that point, insert 21 is entirely embedded in panel 25. The drive shaft 57 is then stopped thereby ceasing all rotational activity of the apparatus and insert.

Figure 21:
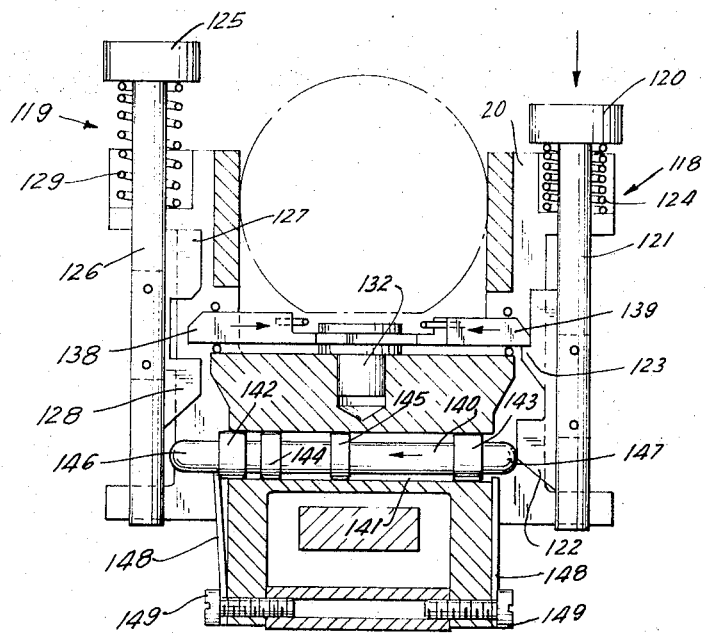
FIG. 21 is an enlarged fragmentary sectional view thereof shown in the potting injection position.

At that time, potting button 120 is depressed against spring 124 so that cam surface 123 engages with cam surface 139 and cam surface 122 engages with tip 147 of pin 140. The displacement of cam 139 causes rotational movement of disc 131 against spring 137. Once cam surface 123 has passed below cam 139 spring 137 returns cam 139 to the original position thereby locking cam 123 beneath cam 139 as shown in FIG. 21. This retains assembly 118 in the down position.

At the same time, pin 140 is moved from the normal position of FIG. 24 into the potting position as shown in FIG. 25. Compressed air from air cylinder 49 forces the piston assembly 80 downward so that piston 80 forces potting compound centrally downward in apparatus 42. The compound passes through openings 83, 88 and central opening 89 in the lower end of the apparatus. The passages down through the apparatus are all interconnected. Sufficient pressure is exerted by piston 80 to force the potting compound to displace ball valve 91 against the pressure of spring 92 and permit the potting compound to flow therepast into and through the hollow openings in pins 94. The potting compound then continues down through openings 37 in insert 21 and is dispersed through interconnected passageways within the insert to engage with shoulders 33 and the remaining major portion of the outer surface of the body of insert 21 within panel 25.

Figure 22:
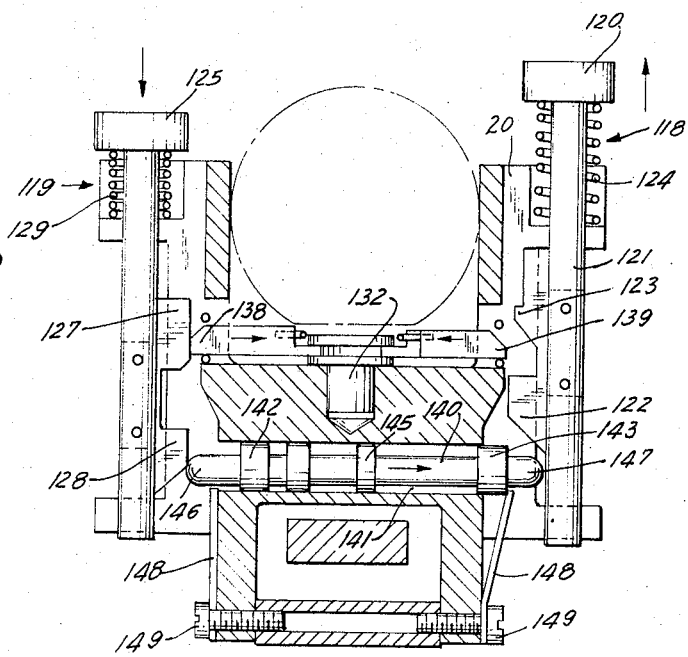
FIG. 22 is an enlarged fragmentary sectional view thereof shown in the insert eject position.
Figure 27:
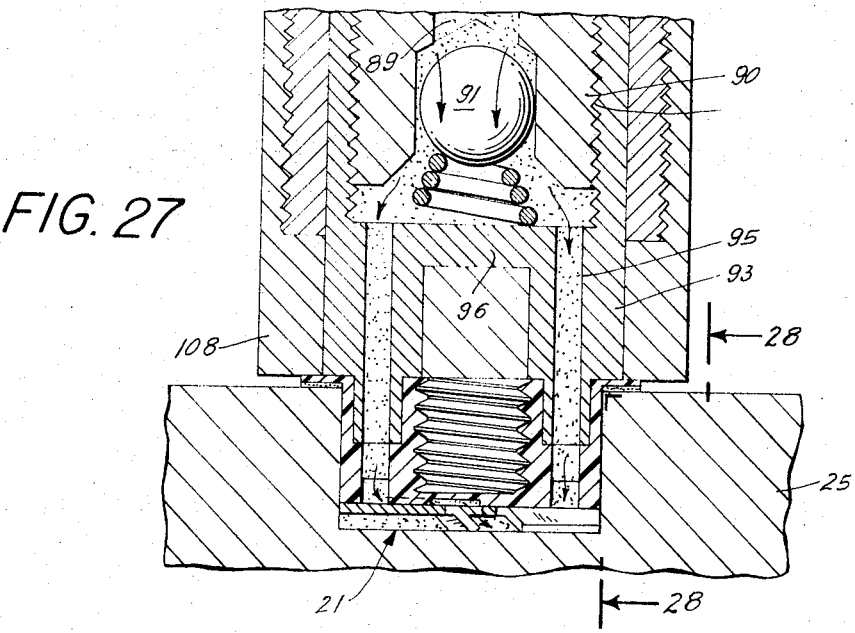
FIG. 27 is an enlarged fragmentary sectional view of the apparatus with an insert attached thereto and positioned in a recess in a panel.
Figure 28:
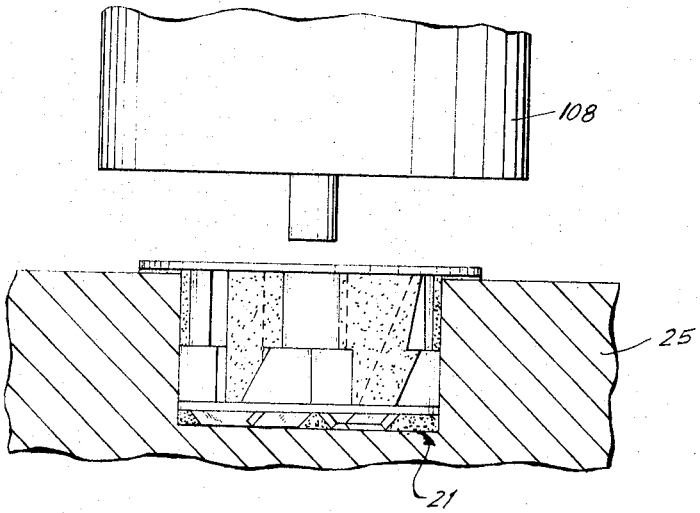
FIG. 28 is a sectional elevation view thereof taken along the plane of line 28—28 of FIG. 27.
Figure 29:
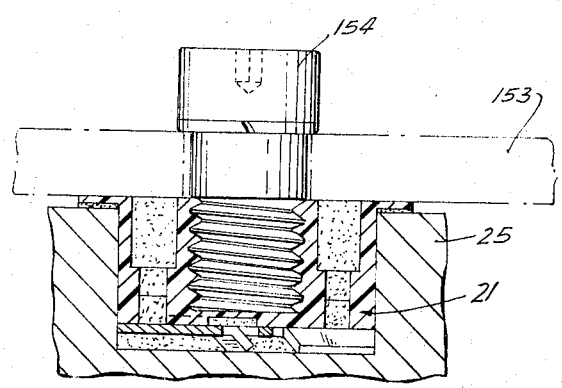
FIG. 29 is an enlarged sectional elevation view of an insert positioned and fastened in a panel and a fastener element connected thereto.

Thereafter, the eject button 125 is depressed as shown in FIG. 22. This causes cam surface 127 to engage with cam surface 138 and cam surface 128 to engage with the end of pin 140 designated as tip 146. Contact between cam surface 127 and cam follower 138 causes follower arm 133 to rotate disc 131 which in turn moves arm 134 horizontally inwardly to free cam 123 from interengagement with the undersurface of cam 139. Spring 124 then returns the potting compound control apparatus 118 to its initial position. Further downward motion of button 125 causes contact between cams 128 and 146 and horizontally moves pin 140 to the position shown in FIG. 26. This permits compressed air to flow between passageways 151 and 152 which activates eject arm 112 and withdraws pins 94 from openings 31 in insert 21. FIG. 27 shows the path of flow of potting compound through the lower portion of apparatus 42 and into insert 21 within panel 25. The potting compound hardens to fasten the insert in position. FIG. 28 depicts the movement of apparatus 42 away from panel 25 and fastened insert 21 after activation of the eject mechanism. The force of arm 112 is transmitted against rigid panel 25 thereby causing the remainder of apparatus to react against panel 25 and be pushed away therefrom to move pins 94 from interengagement with insert 21. In actual assembly and use of fastened insert 21 thereafter, FIG. 29 shows how a panel 153 is positioned with respect to insert 21 and has a passageway therethrough for a fastener 154 which is inserted into central opening 34. The fastener 154 by threaded interengagement thereby locks panel 153 to panel 25.

It should also be noted that release of pressure of piston 80 reduces the pressure within apparatus 42 sufficiently to permit pressure from the potting compound container 45 to open ball valve 77 and refill the interior of apparatus 42 with potting compound for the next insert.

It should also be noted that upon release of eject button 125, it will return to its normal position under the influence of spring 129. There is no interengagement between cam surfaces to retain button 125 in its depressed position as was utilized in respect to button 120 for the potting operation.

Insert 21a is handled in the same manner as insert 21 in the manner in which apparatus 42 is utilized in positioning and fastening the insert in panel 25. All of the insert embodiments are self-cutting to eliminate the necessity of a two-step operation. The insert cuts as it is being inserted thereby providing a great time saving and cost saving advantage. An inexpensive metal cutting surface on the penetrating side of the plastic insert facilitates its use in cutting a hole for the insert in a tough material such as fiberglass as well as in other commonly used materials.

The normal pressure which has been found maintaining the potting compound in readiness for injection into the positioned insert has been approximately 92–100 PSI. This pressure senses when there is not sufficient compound within the interior of the remainder of apparatus 42 and thereafter forces the ball valve 77 to open and permit enough potting compound to enter the remainder of apparatus 42 to equalize the pressure. When compressed air is supplied to the piston assembly by means of depressing the potting button, the pressure within apparatus 42 is increased to approximately 600 PSI to facilitate injection of the potting compound into the positioned insert within panel 25.

Thus, the above discussed objectives, among others, are effectively attained.

I claim:

1. Apparatus for automatically positioning and fastening an insert in a panel comprising:
   a supporting structure;
   releasable holding means on said supporting structure for holding said insert prior to and during the positioning thereof in the panel;
   said releasable holding means including at least one pin extending downwardly from said apparatus and each pin being adapted to engage with a corresponding receptacle on an insert to retain the insert in fixed position with respect to said apparatus;
   drive means on said supporting structure to automatically position said insert in the panel at the desired location;
   a reservoir of potting material associated with said supporting structure for supplying a potting compound to said apparatus;
   potting means on said supporting structure for automatically supplying a predetermined amount of potting material to the positioned insert in the panel to fasten the insert therein;
   eject means on said supporting structure for automatically releasing the insert from the supporting structure after it has been properly positioned in the panel; and
   control means on said supporting structure to orient said insert held by said holding means with respect to the panel, activate said drive means at the desired time, thereafter activate said potting means, and thereafter said eject means after the insert has been positioned and fastened in the panel.

2. The invention in accordance with claim 1 wherein said releasable holding means includes a pair of hollow pins extending downwardly from said apparatus and being adapted to engage with corresponding receptacles on an insert to retain the insert in fixed position with respect to said apparatus during the automatic positioning and fastening of the insert in a panel.

3. The invention in accordance with claim 1 wherein said drive means includes an interconnected drive shaft assembly adapted to receive the insert at one end thereof so that when said drive shaft assembly is rotated by a motor, said attached insert will be simultaneously rotated and means on said insert will form a hole in a panel to receive the insert.

4. The invention in accordance with claim 1 wherein said reservoir of potting material includes a container having one open end and potting material within said container under a predetermined pressure, the open end of said container being attached to the supporting structure, and a valve means interconnected with the container and the supporting structure so as to normally prevent flow of potting fluid therebetween, the valve means cooperating with means on the supporting structure to permit flow of potting fluid from the container to the remainder of supporting structure when the valve means is moved to the open position in response to predetermined conditions within the supporting structure.

5. The invention in accordance with claim 1 wherein said potting means on said supporting structure includes a plurality of interconnected channels within said supporting structure, an inject opening at one end of said supporting structure normally closed by an inject valve means, an opening distal from said inject opening to communicate with a container of potting compound, a potting supply valve means normally closing the opening between said potting compound container and the interior of said supporting structure, movable piston means on said supporting structure to displace said potting compound and unseat said inject valve means to permit potting compound to be injected from said supporting structure, and said potting compound valve means being responsive to a reduction of pressure within the channels in said supporting structure to unseat and permit the pressurized potting compound within said container to enter the channels within said supporting structure, pressure means connected to said piston to drive said piston within said supporting structure during the injection of said potting compound.

6. The invention in accordance with claim 1 wherein said eject means includes vertically movable means on said supporting structure, an eject lever pivotally mounted on said supporting structure and normally in engagement with said vertically movable portion of the supporting structure, said vertically movable portion being in engagement with said panel when said insert is properly positioned in said panel, lever moving means for moving said lever and interengaged vertically movable portion of said supporting structure against said panel with the panel being in fixed position so that said apparatus is thereby forced away from said panel and from interengagement with said insert located in said panel.

7. The invention in accordance with claim 1 wherein said eject means and said potting means are automatically operated by an interconnected source of compressed air.

8. The invention in accordance with claim 1 wherein said control means includes a horizontally slideable pin shiftable between a series of positions to open and close compressed air flow to operate said potting means and said eject means in a predetermined manner, a potting control button on said supporting structure to interengage with one end of said slideable pin to shift the pin when desired to a position whereby compressed air is permitted to engage with said potting means to supply a predetermined amount of potting material to a positioned insert in a panel, an eject control mechanism on said supporting structure positioned so as to engage with another portion of said slideable pin to shift said pin to a position whereby compressed air is permitted to engage with said eject means to withdraw said apparatus from an insert which has been positioned and fastened in a panel.

9. The invention in accordance with claim 1 wherein an insert is releaseably mounted on said apparatus.

* * * * *